United States Patent
Blank

(10) Patent No.: US 8,645,207 B2
(45) Date of Patent: Feb. 4, 2014

(54) MARKETING METHOD AND COMMUNICATION SYSTEM FOR IMPLEMENTING THE MARKETING METHOD

(75) Inventor: Felix Blank, München (DE)

(73) Assignee: Siemens Enterprise Communications GmbH & Co. KG, Munich (DE)

(*) Notice: Subject to any disclaimer, the term of this patent is extended or adjusted under 35 U.S.C. 154(b) by 2113 days.

(21) Appl. No.: 11/663,867

(22) PCT Filed: Sep. 7, 2005

(86) PCT No.: PCT/EP2005/054406
§ 371 (c)(1),
(2), (4) Date: Oct. 5, 2007

(87) PCT Pub. No.: WO2006/034944
PCT Pub. Date: Apr. 6, 2006

(65) Prior Publication Data
US 2008/0215739 A1    Sep. 4, 2008

(30) Foreign Application Priority Data
Sep. 28, 2004  (DE) .......................... 10 2004 047 020

(51) Int. Cl.
*G06Q 30/00*  (2012.01)
(52) U.S. Cl.
USPC ................... 705/14.49; 705/14.5; 705/14.64; 705/14.66

(58) Field of Classification Search
USPC ............................................. 705/14.1–14.73
See application file for complete search history.

(56) References Cited

U.S. PATENT DOCUMENTS 6,055,513 A      4/2000  Katz et al.
2004/0203963 A1*  10/2004  Shivaram et al. ............. 455/466

FOREIGN PATENT DOCUMENTS

WO    WO 2004/042608 A2    5/2004

* cited by examiner

*Primary Examiner* — Scott D Gartland
(74) *Attorney, Agent, or Firm* — Buchanan Ingersoll & Rooney PC

(57) ABSTRACT

In one aspect, a database in which target subscribers of different subscriber classes that can be reached via a communications system are allocated, and one respective marketer is assigned to each of the subscriber classes. When the communications system establishes a first communications relation between a first subscriber and a target subscriber while using a destination address given by the first subscriber, the subscriber class of the target subscriber is determined based on the destination address. The determination of the subscriber class results in the establishment of a second communications relation between the first subscriber and a marketer assigned to the determined subscriber class.

9 Claims, 1 Drawing Sheet

MARKETING METHOD AND COMMUNICATION SYSTEM FOR IMPLEMENTING THE MARKETING METHOD

CROSS REFERENCE TO RELATED APPLICATIONS

This application is the US National Stage of International Application No. PCT/EP2005/054406, filed Sep. 7, 2005 and claims the benefit thereof. The International Application claims the benefits of German application No. 102004047020.0 DE filed Sep. 28, 2004, both of the applications are incorporated by reference herein in their entirety.

FIELD OF INVENTION

The present invention relates to a marketing method and communication system for implementing the marketing method

BACKGROUND OF INVENTION

With current marketing methods it is becoming increasingly important to advertise and offer goods or services in a targeted and customer-specific manner. With many such marketing methods customer behavior is first analyzed and evaluated in order to carry out targeted, customer-specific marketing campaigns on the basis thereof.

One method of creating customer profiles, which is currently the subject of broad discussion, is based on what are known as RFID (Radio Frequency Identification) labels, each having an identifier that can be read in a contactless manner and is unique worldwide. RFID labels are small enough to be able to be applied to a plurality of products, to identify these uniquely. To create an individual customer profile, goods purchased by a customer are identified on the basis of their RFID identifier and stored with assignment to the, for example biometrically identified, customer. An evaluation of this data about customer behavior, stored in a customer-specific manner, can be used later for targeted advertising tailored to customer requirements or for other customer-specific marketing campaigns.

SUMMARY OF INVENTION

To implement such a method, it is however necessary first of all to provide a plurality of goods with RFID labels. The gathering of information about a respective customer also generally requires a certain time delay before a targeted marketing campaign can be carried out. Short-term customer requirements can therefore only be taken into account to a limited extent.

An object of the present invention is to specify a marketing method and a communication system, which allow marketing that is tailored in an up to date manner to current customer requirements.

This object is achieved by a method and communication system as described in the claims.

Advantageous embodiments and developments of the invention are set out in the dependent claims.

According to the invention target subscribers, who can be accessed by way of the communication system, are assigned to different subscriber classes in a data base of a communication system, with at least one marketer, e.g. an advertising agency or a provider of goods or services, being assigned respectively to said subscriber classes. The communication system can for example be realized by a public or private communication network or by a number of coupled communication networks. When the communication system sets up a first communication relation, based on a destination address, e.g. a call number or email address, specified by a first subscriber, between the first subscriber and a target subscriber identified by the destination address, a subscriber class, with which the target subscriber identified by the destination address is associated, is determined based on the destination address. The first communication relation here can for example be a telephone or fax connection or the transmission of an email, SMS or message in the context of what is known as instant messaging. Such determination of the subscriber class allows a second communication relation to be set up (for example by telephone, fax, email, SMS, instant messaging) by the communication system between the first subscriber and a marketer assigned to the determined subscriber class.

The invention allows targeted, customer-specific marketing as a function of the current communication behavior of subscribers of the communication system, who can thus be contacted or addressed as potential customers. In particular the invention allows a fast response to communication processes initiated by subscribers, in such a manner that even short-term customer needs can be taken into account in an up to date manner, in real time, as it were. The fast response means that it is also very likely that the relevant subscriber will still be within range of the communication system.

If a number of marketers are assigned to one subscriber class, it is possible in some instances for one or more marketers to be selected by the first subscriber and/or as a function of characteristics of the first communication relation, e.g. duration, information transmitted, etc.

According to an advantageous development of the invention a subscriber class-specific and/or marketer-specific marketing campaign respectively can be assigned to the subscriber classes and/or a respective marketer in the database. It is then possible in the context of the second communication relation to initiate a marketing campaign assigned to the determined subscriber class and/or the assigned marketer.

Where there are a number of assigned marketing campaigns, one or more of the assigned marketing campaigns can be selected by the first subscriber and/or as a function of characteristics, e.g. duration or information transmitted, of the first communication relation or another communication behavior of the first subscriber. It is thus possible to tailor a marketing campaign more specifically to customer needs.

According to an advantageous embodiment of the invention the setting up of the second communication relation can be prompted by termination of the first communication relation, e.g. by the first subscriber hanging up.

In particular it is possible to initiate a connection, e.g. a telephone connection, between the first subscriber and the marketer assigned to the determined subscriber class as a second communication relation essentially immediately after termination of the first communication relation. It is thus possible for example for the communication system to initiate a telephone connection between the first subscriber and the assigned marketer for example immediately after the first subscriber has hung up, in such a manner that an incoming telephone call is signaled to both the first subscriber and the assigned marketer respectively. Once the call has been accepted on both sides, the telephone connection is switched through.

According to an advantageous development of the invention the communication system can capture address information identifying the first subscriber, e.g. the latter's telephone number or email address. The captured address information is then compared with address entries in an address list in the database and if the result of the comparison is positive, initiation of the second communication relation is prevented. The address list can be what is known as a Robinson list for example, in which subscriber addresses of subscribers, who do not wish to receive marketing, are stored.

Provision can also be made for the communication system to transmit inquiry information relating to the second communication relation, for example relating to an assigned marketer and/or an assigned marketing campaign, to the first subscriber and for the second communication relation to be set up as a function of response information input by the first subscriber. It is thus possible for a marketer and/or a marketing campaign for example to be selected by the first subscriber. The inquiry information can be transmitted for example by means of what is known as a voice prompt, an email, SMS or another message. The response information can be input for example by a keystroke or voice input at the terminal of the first subscriber. The inquiry information can preferably be transmitted while the first communication relation with the first subscriber still exists, being displayed there for example on a display unit of a telephone or other terminal. The above-mentioned possibilities for influencing the marketing process generally achieve a higher level of acceptance of such marketing by potential customers.

According to a further embodiment of the invention the communication system can transmit inquiry information relating to the first communication relation to the marketer assigned to the determined subscriber class, for example by telephone, fax, email, SMS, etc. The second communication relation can then be set up as a function of response information input by the marketer. It is thus possible for the relevant marketer to select the marketing campaign to be carried out and/or a communication medium for the second communication relation for example. This allows the marketer to take even short-term marketing requirements into account in a very flexible manner.

BRIEF DESCRIPTION OF THE DRAWINGS

An exemplary embodiment of the invention is described in more detail below with reference to the drawing, in which.

DETAILED DESCRIPTION OF INVENTION

Figure 1:
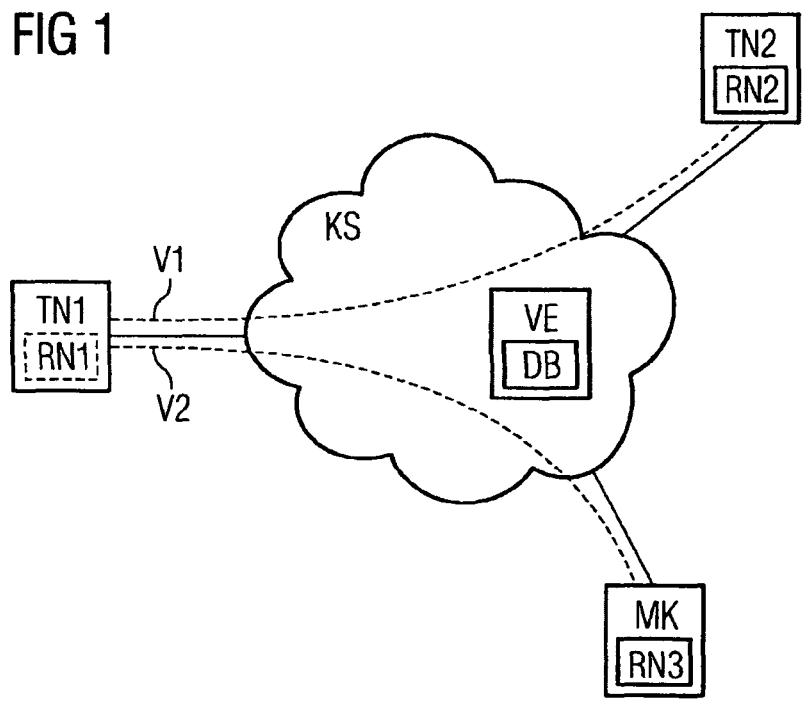
FIG. 1 shows a schematic diagram of a communication system during the implementation of an inventive marketing method and FIG. 2 shows a schematic diagram of a database of the communication system.

FIG. 1 shows a schematic diagram of a communication system KS, e.g. a public or private telephone network, a local network, the internet or a group of interconnected communication networks, to implement the inventive method. The communication system KS has a switching facility VE with a database DB. The switching facility VE here can be a telephone network switching unit, a router, a server with switching control or an application running thereon. Subscribers TN1, TN2 and MK are connected to the communication system KS. The subscriber TN1 is identified in respect of the communication system KS by an address RN1, the subscriber TN2 by an address RN2 and the subscriber MK by an address RN3. The addresses RN1, RN2 and RN3 can be telephone numbers, email addresses, internet addresses or other address data for example.

It should be assumed for the present exemplary embodiment that the addresses RN1, RN2 and RN3 are telephone numbers. It should also be assumed for the purpose of illustration that the subscriber TN1 calls the subscriber TN2, a pizza service, as a customer, to order a pizza. The telephone call causes a first communication relation V1 to be set up between the subscriber TN1 and the subscriber TN2, as the target subscriber. The setting up of this connection is capture by the switching facility VE together with the associated destination call number RN2. The switching facility VE identifies from the captured destination call number RN2 that the called subscriber TN2 is associated with a subscriber class "pizza service". The switching facility VE then prepares a telephone connection V2, as the second communication relation, between the subscriber TN1 and a marketer assigned to the subscriber class "pizza service", in this instance MK. The marketer MK may for example be an advertising agency, a provider of goods or services or another marketing operator. In the present exemplary embodiment it should be assumed that the marketer MK assigned to the subscriber class "pizza service" is a wine merchant. Such an assignment appears advantageous, in so far as when ordering a pizza, there is frequently a need to order wine. The telephone connection V2 is initiated by the switching facility VE immediately after termination of the connection V1. As an alternative or in addition to the telephone connections V1 and V2 the first and/or second communication relation can be established for example by email transmissions, SMS transmissions, fax transmissions or instant messaging transmissions.

Figure 2:
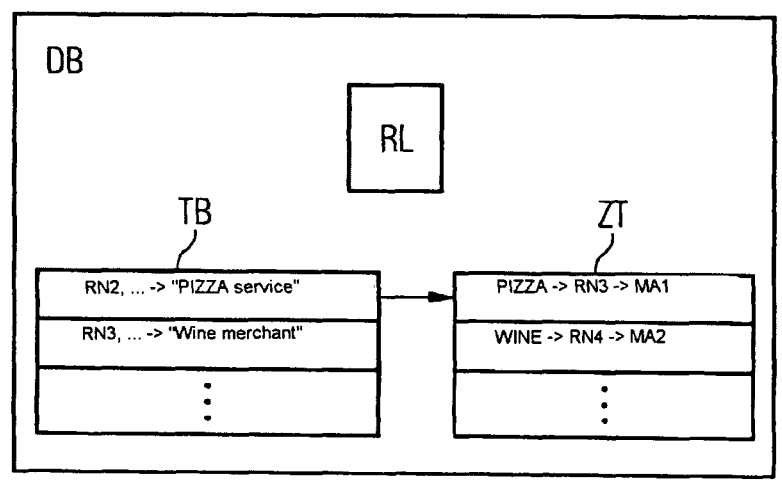

FIG. 2 shows the database DB of the switching facility VE in more detail than in FIG. 1. The database DB comprises an electronic telephone directory TB, an assignment table ZT and an address list RL functioning as what is known as a Robinson list. In the present exemplary embodiment the address list RL contains call numbers of subscribers, who do not wish to receive marketing campaigns or have a communication relation with a marketer.

In the electronic telephone directory TB call numbers RN2, RN3, ... of subscribers TN2, MK, ... of the communication system KS are assigned subscriber names or designations. It should be assumed for the following exemplary embodiment that the call number RN2 is assigned the subscriber designation "PIZZA service" and the call number RN3 is assigned the subscriber designation "wine merchant" in the electronic telephone directory TB.

In the assignment table ZT different subscriber classes PIZZA, WINE, ... are assigned marketers by way of their call numbers, in this instance RN3, RN4, ... , and marketing campaigns MA1, MA2, .... In the present exemplary embodiment the marketer MK and the marketing campaign MA1 are assigned to the subscriber class PIZZA by way of the call number RN3. The subscriber class WINE is correspondingly assigned a further marketer (not shown) by way of their call number RN4 as well as a further marketing campaign MA2. The subscriber classes PIZZA, WINE, ... provided in the assignment table ZT are preferably formed in an analogous manner to a predeterminable classification of potential customer needs. Correspondingly those target subscribers, from whom a pizza can be ordered, should be captured by the subscriber class PIZZA and those target subscribers, from whom wine can be ordered, should be captured by the subscriber class WINE. In the present exemplary embodiment those target subscribers, in this instance RN2, whose subscriber designation in the telephone directory TB contains the word "pizza", are assigned to the subscriber class PIZZA and those subscribers, in this instance MK, whose subscriber designation in the telephone directory TB contains the word "wine", are assigned to the subscriber class WINE. Naturally a plurality of further subscriber classes can be identified by predeterminable word or sentence components in the telephone directory entry or in entries in other databases, in addition to the subscriber classes PIZZA and WINE given by way of example.

A respective subscriber class is advantageously assigned a marketer, whose offering complements a respective offering of said subscriber class as advantageously as possible. Thus in the present exemplary embodiment the subscriber class PIZZA is assigned the wine merchant MK as marketer by way of the call number RN3, as it is frequently the case that a customer ordering a pizza, in this instance TN1, is also interested in wine.

Different, preferably marketer-specific campaigns, e.g. an immediate callback by the respective marketer, a faxback or an email can also be provided as marketing campaigns MA1, MA2, . . . .

In the present exemplary embodiment the switching facility VE searches through the address list RL for the call number RN1 of the calling subscriber TN1, in the context of the connection V1 from the subscriber TN1 to the target subscriber TN2. If the call number RN1 of the subscriber TN1 is entered in the address list RL, no marketing campaign takes place and no second communication relation V2 is set up with a marketer.

If the call number RN1 of the subscriber TN1 is not found in the address list RL, the switching facility VE ascertains, based on the destination call number RN2 of the connection V1, whether the subscriber identified by the destination call number RN2 is associated with a subscriber class and optionally determines this subscriber class. In the present exemplary embodiment a search is carried out for this purpose for the call number RN2 in the telephone directory TB and the subscriber designation assigned to the call number RN2, in this instance "PIZZA service" is determined. The determined subscriber designation "PIZZA service" is then compared with designations of subscriber classes PIZZA, WINE, . . . contained in the assignment table ZT. Correspondence with the name component "PIZZA" means that the target subscriber TN2 is identified as assigned to the subscriber class PIZZA. The call number RN3 of the marketer MK assigned to the identified subscriber class PIZZA in the assignment table ZT and the marketing campaign MA1 to be carried out are then determined. It should be assumed for the present exemplary embodiment that the determined marketing campaign MA1 initiates the immediate setting up of the connection V2 between the calling subscriber TN1 and the marketer MK after termination of the connection V1. It is thus possible for the subscriber TN1 to be connected to the wine merchant MK immediately after termination of their call to the pizza service TN2, in real time, as it were, so that said wine merchant MK can present their wine offering to the subscriber TN1.

According to an advantageous variant of the invention, the subscriber TN1 can be asked about possible procedure options before the marketing campaign is carried out. In the case of a telephone connection, this can be done for example by means of what is known as a voice prompt, for example with the announcement "If you wish to hear about further product offerings, press 1 or continue speaking". In the case of an email-based communication relation, the subscriber TN1 can be sent an email with selection buttons for different procedure options.

The switching facility VE can preferably present the subscriber TN1 with possible marketing campaigns or options while the connection V1 still exists between the subscribers TN1 and TN2. In the case of a telephone system this can be done for example by means of a text output on a telephone display unit of the subscriber TN1, it being possible for the subscriber TN1 to select the marketing campaign or option they wish by pressing a telephone key.

Different communication options can be provided for a respective marketer, in this instance MK. Provision can thus be made in the case of a telephone system for the connection V2 to be initiated immediately after the subscriber TN1 terminates the connection V1 by hanging up, in such a manner that a call is signaled by ringing for both the subscriber TN1 and the marketer MK. After the subscriber TN1 has accepted the connection V2 and the selection options mentioned above have optionally been run through for the subscriber TN1, the connection V2 is switched through.

As an alternative provision can be made for the first communication relation V1 to be notified to the marketer MK, to that this latter can select the marketing campaign to be carried out.

A selection option can also be provided for the marketer MK, allowing them to select a respective response medium, optionally as a function of the communication medium selected for the first communication relation V1, for example an email in the case of a telephone call from the subscriber TN1 or a telephone call in the case of a fax from the subscriber TN1.

The invention claimed is:

1. A marketing method for a communication system, comprising:
   providing a database in the communication system;
   associating a destination address of a target subscriber to a subscriber class, the association stored in the database, the target subscriber accessible via the communication system by the destination address;
   assigning a marketer to the subscriber class, the assignment stored in the database;
   setting up a first communication relation between a first subscriber and the target subscriber identified by the destination address via the communication system based on the destination address specified by the first subscriber;
   querying the database for the subscriber class associated with the target subscriber identified by the destination address;
   setting up a second communication relation between the first subscriber and the marketer assigned to the queried subscriber class via the communication system; and
   the marketer sending the first subscriber an offer via the second communication relation set up by the communication system.

2. The marketing method as claimed in claim 1, wherein a marketing campaign is assigned to the subscriber class or marketer, the assignment is stored in the database, and wherein the marketing campaign is initiated via the second communication relation.

3. The marketing method as claimed in claim 1, wherein the setting up of the second communication relation is in response to a termination of the first communication relation.

4. The marketing method as claimed in claim 3, wherein the setup of the second communication relation is after termination of the first communication relation.

5. The marketing method as claimed in claim 1, wherein address information identifying the first subscriber is captured by the communication system,
   wherein the captured address information is compared with address entries in an address list in the database, and
   wherein if the captured address of the first subscriber is found in the address list the second communication relation is not setup.

6. The marketing method as claimed in claim 1, wherein the communication system transmits inquiry information relating to the second communication relation to the first subscriber and the second communication relation is set up as a function of response information input provided by the first subscriber.

7. The marketing method as claimed in claim 6, wherein the inquiry information is transmitted while the first communication relation with the first subscriber still exists.

8. The marketing method as claimed in claim 7, wherein the inquiry information is displayed to the first subscriber.

9. The marketing method as claimed in claim 1, wherein the communication system transmits inquiry information relating to the first communication relation to the marketer, and wherein the second communication relation is set up as a function of response information input by the marketer.

* * * * *